United States Patent
Kim et al.

(10) Patent No.: US 10,779,180 B2
(45) Date of Patent: Sep. 15, 2020

(54) METHOD AND DEVICE FOR PERFORMING MEASUREMENT REPORT BY TERMINAL ON BASIS OF TTT ABORT TIMER

(71) Applicant: LG ELECTRONICS INC., Seoul (KR)

(72) Inventors: Sangwon Kim, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 15/772,849

(22) PCT Filed: Oct. 27, 2016

(86) PCT No.: PCT/KR2016/012139
§ 371 (c)(1),
(2) Date: May 2, 2018

(87) PCT Pub. No.: WO2017/078325
PCT Pub. Date: May 11, 2017

(65) Prior Publication Data
US 2018/0317113 A1 Nov. 1, 2018

Related U.S. Application Data

(60) Provisional application No. 62/250,449, filed on Nov. 3, 2015.

(51) Int. Cl.
*H04W 24/10* (2009.01)
*H04W 24/08* (2009.01)
*H04W 24/04* (2009.01)

(52) U.S. Cl.
CPC ........... *H04W 24/10* (2013.01); *H04W 24/04* (2013.01); *H04W 24/08* (2013.01)

(58) Field of Classification Search
CPC ...... H04W 24/04; H04W 24/08; H04W 24/10
See application file for complete search history.

(56) References Cited

U.S. PATENT DOCUMENTS

| 2009/0185524 A1 | 7/2009 | Sammour |
| 2013/0040692 A1* | 2/2013 | Chen ............... H04W 36/04 455/525 |

(Continued)

FOREIGN PATENT DOCUMENTS

| CA | 2936153 | 7/2015 |
| KR | 1020110028644 | 3/2011 |
| WO | 2015021012 | 2/2015 |

OTHER PUBLICATIONS

NTT Docomo, Inc.: "Layer3 filtering behavior in LAA", R2-154660, 3GPP TSG RAN WG2 Meeting #91bis, Malmo, Sweden, Oct. 5-9, 2015.

(Continued)

*Primary Examiner* — Edan Orgad
*Assistant Examiner* — Nourali Mansoury
(74) *Attorney, Agent, or Firm* — Dentons US LLP

(57) ABSTRACT

Provided are a method for performing a measurement report by a terminal on the basis of a time-to-trigger (TTT) abort timer in a wireless communication system and a device for supporting same. A terminal is for initiating a TTT timer and initiating a TTT abort timer, wherein the TTT abort timer can be initiated in an interval in which the TTT timer operates.

15 Claims, 11 Drawing Sheets

(56) References Cited

U.S. PATENT DOCUMENTS

| | | | |
|---|---|---|---|
| 2013/0196664 A1* | 8/2013 | Yiu | H04W 4/70 |
| | | | 455/436 |
| 2014/0133465 A1* | 5/2014 | Johansson | H04W 24/04 |
| | | | 370/332 |
| 2014/0302865 A1 | 10/2014 | Bai et al. | |
| 2015/0271717 A1 | 9/2015 | Moon et al. | |
| 2015/0334626 A1* | 11/2015 | Chen | H04W 36/04 |
| | | | 455/437 |
| 2015/0365859 A1* | 12/2015 | Dalsgaard | H04W 36/0088 |
| | | | 370/331 |

OTHER PUBLICATIONS

CMCC: "Remaining issues related to RRM measurements", R2-154135, 3GPP TSG RAN WG2 Meeting #91bis, Malmo, Sweden, Oct. 5-9, 2015.
Sony: "TTT handling for LAA RSRP/RSRQ measurements", R2-153125, 3GPP TSG RAN WG2 Meeting #91, Beijing, China, Aug. 24-28, 2015.
Gora, et al.: "3GPP Mobile Communications: LTE/SAE and LTE-A", XP055588144, Engineering Guidelines for Fixed, Mobile and Satellite Systems, John Wiley & Sons, Ltd., Feb. 16, 2015, pp. 417-514.

\* cited by examiner

METHOD AND DEVICE FOR PERFORMING MEASUREMENT REPORT BY TERMINAL ON BASIS OF TTT ABORT TIMER

CROSS-REFERENCE TO RELATED APPLICATIONS

This application is the National Stage filing under 35 U.S.C. 371 of International Application No. PCT/KR2016/012139, filed on Oct. 27, 2016, which claims the benefit of U.S. Provisional Application No. 62/250,449 filed on Nov. 3, 2015, the contents of which are all hereby incorporated by reference herein in their entirety.

BACKGROUND OF THE INVENTION

Field of the Invention

The present invention relates to a wireless communication system, and more particularly, to a method of performing a measurement report on the basis of a TimeToTrigger (TTT) abort timer by a terminal in a wireless communication system, and an apparatus supporting the method.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A wireless communication system may need to estimate an uplink channel or downlink channel to transmit/receive data, to achieve system synchronization, and to feed back channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

Binding using the LTE-U (LTE in Unlicensed spectrum) or LAA (Licensed-Assisted Access using LTE) is LTE licensed band (licensed band) to by the anchor (anchor), CA (carrier aggregation) the license band and the unlicensed band the technology. A UE is connected to the first network in the licensed band. The base station according to circumstances can be a combination of licensed band and the unlicensed band to offloading traffic to the unlicensed band of the licensed band (offloading).

LTE-U by extending the benefits of the LTE in the unlicensed band may provide for enhanced mobility, security and the communication quality, compared with the existing wireless connection (radio access) technology to LTE to increase the high frequency efficiency, the throughput (throughput) can.

Unlike licensed bands that utilize proprietary ensure the unlicensed bands are shared with various wireless access technologies such as WLAN. Therefore, each communication node is obtained using a channel in the unlicensed band based on competition, it is called CSMA/CA (Carrier sense multiple access with collision avoidance). Each communication node to perform channel sensing before transmitting the signal and channel will need to determine if the children, it is referred to as CCA (clear channel assessment).

SUMMARY OF THE INVENTION

If a TimeToTrigger (TTT) is aborted whenever an L3 filter is reset, measurement reporting for an unlicensed frequency may not be performed even if a radio condition is not bad. Therefore, there is a need to propose a method of performing the measurement reporting on the basis of a TTT abort timer by a terminal, and an apparatus supporting the method.

According to an embodiment, there is provided a method of performing measurement reporting on the basis of a TTT abort timer by a terminal in a wireless communication system. The terminal may start a TTT timer and start the TTT abort timer. The TTT abort timer may start during the TTT timer is running.

The TTT abort timer may start when a valid first layer measurement sample is not delivered to a third layer during a determined period. The determined period may be a time period ranging from a time at which an L3 filter reset timer starts to a time at which the L3 filter reset timer expires.

The TTT abort timer may start when it is considered that a L3 layer measurement result is unavailable. The L3 layer measurement result may be calculated by performing L3 filtering on a measurement sample delivered from the L1 to the L3.

The TTT about timer may start when the L3 filter is deactivated.

The method may further include stopping the started TTT abort timer.

The TTT abort timer may stop when a valid L1 measurement sample arrives at the L3 before expiry of the TTT abort timer.

The TTT abort timer may stop when it is considered that an L3 measurement result is available before expiry of the TTT abort timer. The method may further include reporting, by the terminal, the L3 measurement result to a network when the L3 measurement result satisfies a measurement report trigger condition.

The TTT abort timer may stop when the L3 filter is activated before expiry of the TTT abort timer.

The TTT abort timer may stop when measurement reporting is performed before expiry of the TTT abort timer.

The TTT timer may start when the L3 measurement result satisfies the measurement report trigger condition.

Upon expiry of the TTT abort timer, the started TTT timer may stop, and the measurement reporting may not be performed.

A problem in which measurement reporting is not performed even if a channel state is good can be solved.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
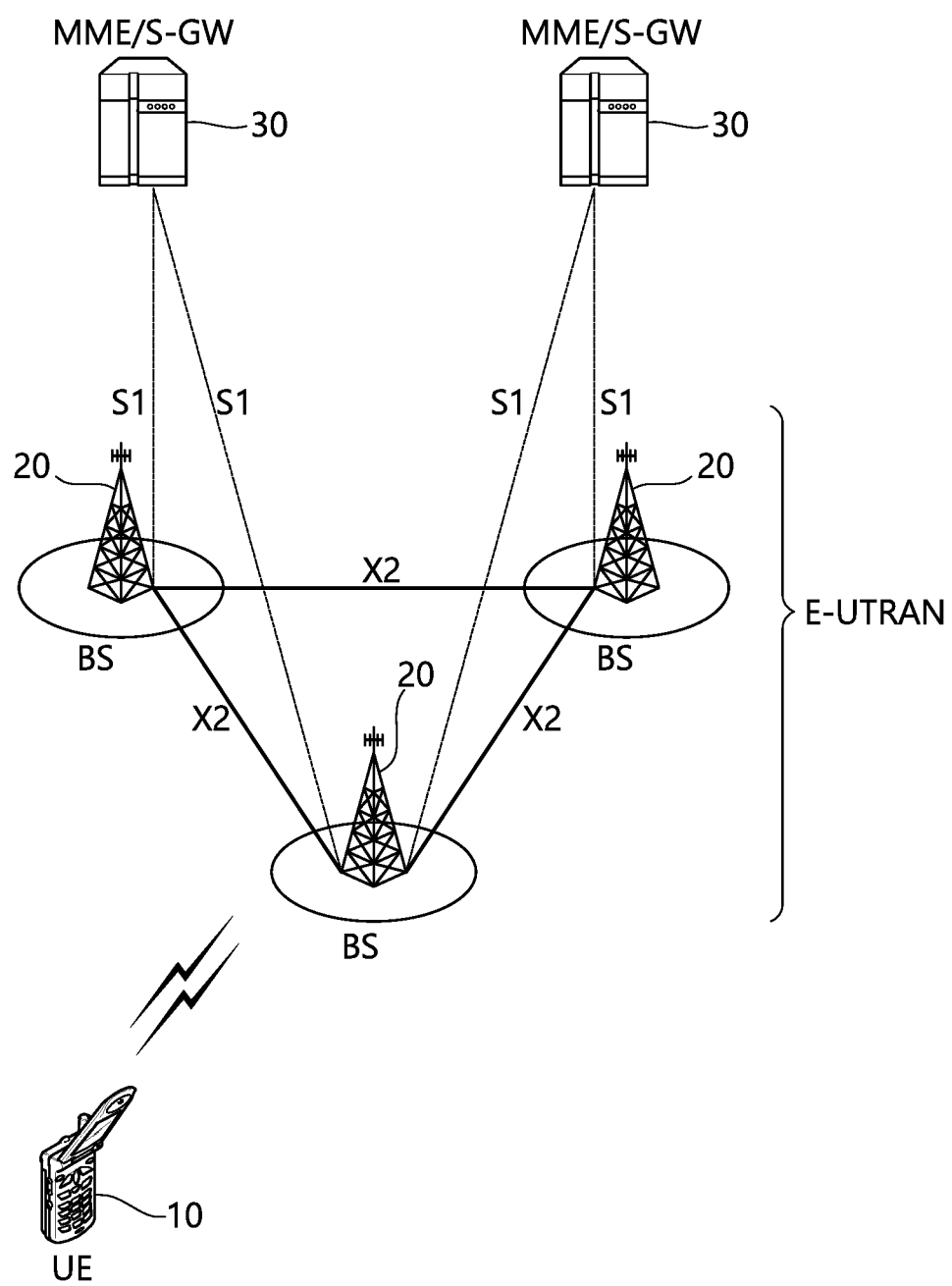
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
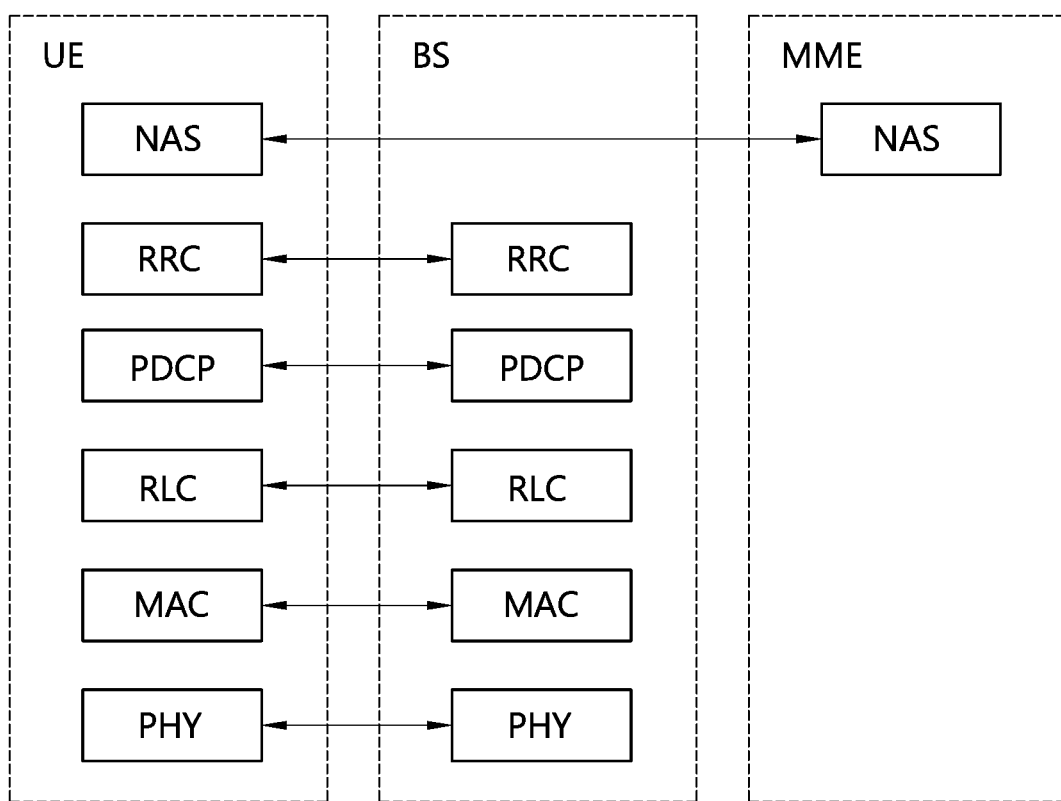
FIG. 2 shows a control plane of a radio interface protocol of an LTE system.
Figure 3:
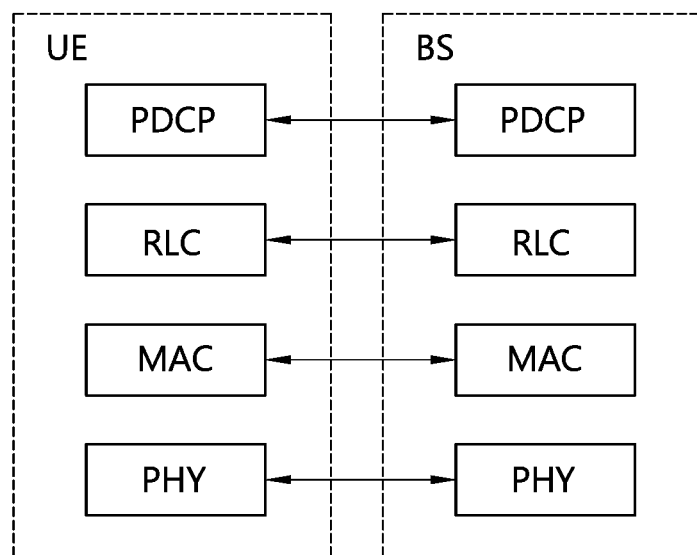
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. Ihen the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
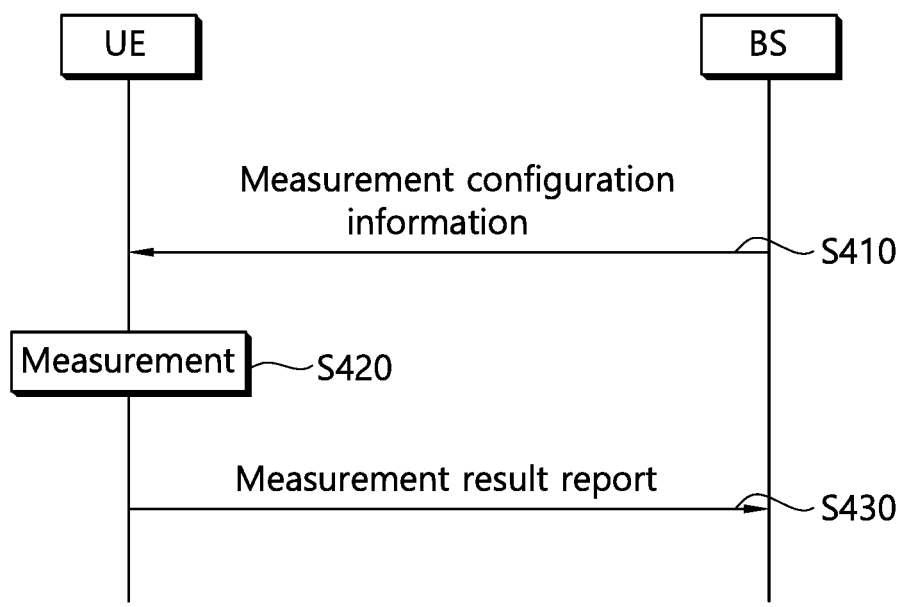
FIG. 4 shows a conventional method of performing measurement.

FIG. 4 shows a conventional method of performing measurement.

A UE receives measurement configuration information from a BS (S410). A message including the measurement configuration information is referred to as a measurement configuration message. The UE performs measurement based on the measurement configuration information (S420). If a measurement result satisfies a reporting condition included in the measurement configuration information, the UE reports the measurement result to the BS (S430). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
|---|---|
| Event A1 | Serving becomes better than threshold |
| Event A2 | Serving becomes worse than threshold |
| Event A3 | Neighboring becomes offset better than PCell/PSCell |
| Event A4 | Neighboring becomes better than threshold |
| Event A5 | PCell/PSCell becomes worse than threshold1 and neighboring becomes better than threshold2 |
| Event A6 | Neighboring becomes offset better than SCell |
| Event B1 | Inter RAT neighboring becomes better than threshold |
| Event B2 | PCell becomes worse than threshold1 and inter RAT neighboring becomes better than threshold2 |
| Event C1 | CSI-RS resource becomes better than threshold |
| Event C2 | CSI-RS resource becomes offset better than reference CSI-RS resource |

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measurement quality of the neighboring cell. The measured quality may include at least one of reference signal received power (RSRP) and reference signal received quality (RSRQ).

Figure 5:
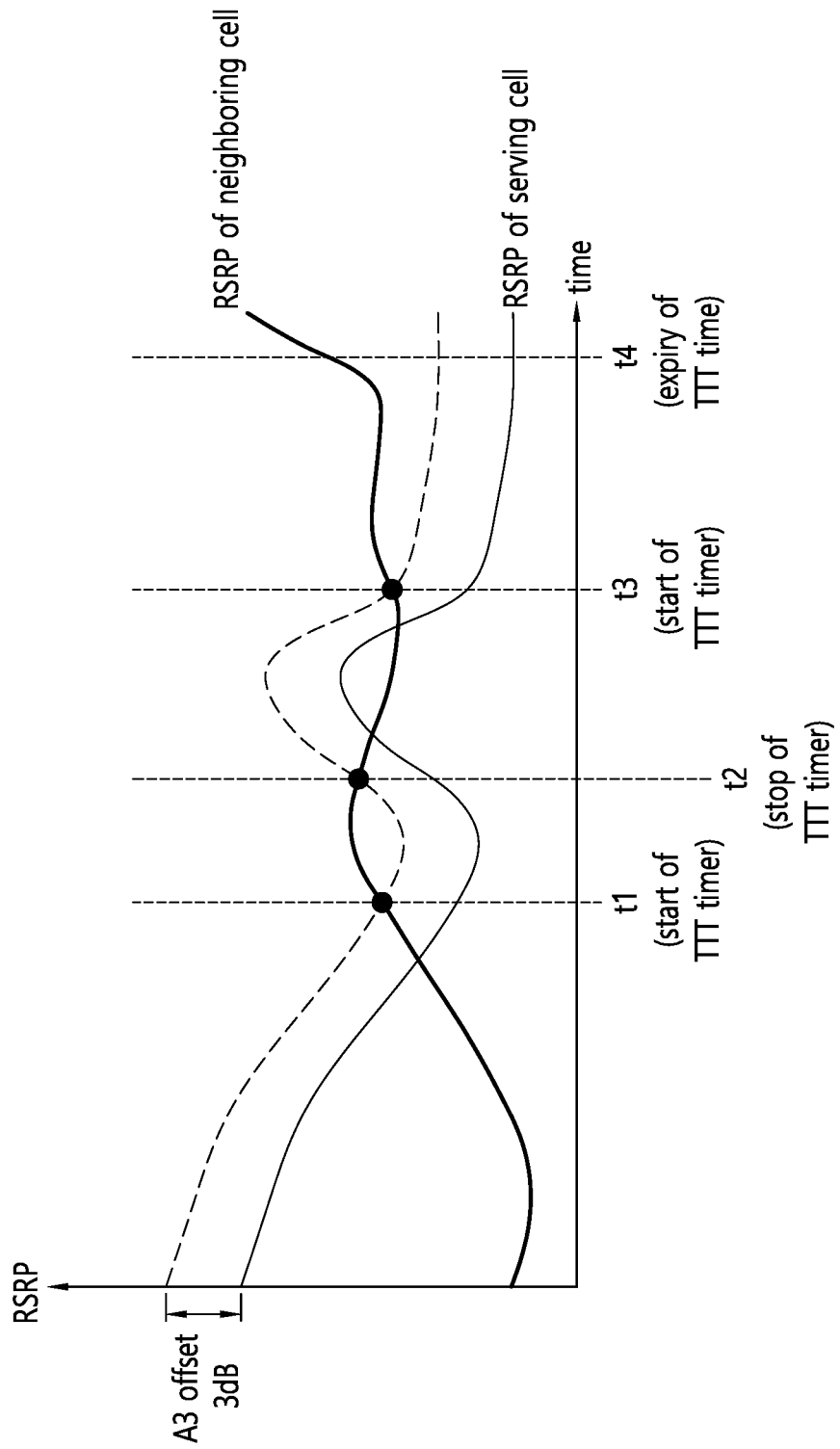
FIG. 5 shows an example of a measurement report trigger using a TimeToTrigger (TTT).

FIG. 5 shows an example of a measurement report trigger using a TimeToTrigger (TTT).

To determine whether a measurement report event is satisfied, a UE may persistently measure RSRP of a serving cell and RSRP of a neighboring cell or the like. The UE may perform measurement reporting on the serving cell when a predetermined time to trigger (TTT) expires from a time at which an RSRP measurement value of the neighboring cell is greater than a value obtained by adding an offset to an RSRP measurement value of the serving cell.

Referring to FIG. 5, the measurement reporting may be triggered when the predetermined TTT elapses from a time t1 at which the RSRP measurement value of the neighboring cell is greater than the value obtained by adding the offset to the RSRP measurement value of the serving cell. However, before the predetermined time elapses from the time t1, the RSRP measurement value of the neighboring cell is less than the value obtained by adding the offset to the RSRP measurement value of the serving cell, and thus the measurement reporting is not triggered. Further, a TTT timer stops.

Thereafter, the measurement reporting may be triggered when a predetermined time TTT elapses from a time t3 at which the RSRP measurement value of the neighboring cell is greater than the value obtained by adding the offset to the RSRP measurement value of the serving cell. Therefore, the UE may perform measurement reporting on the serving cell. The offset and the predetermined time may be determined by a network.

A TimeToTrigger Information Element (IE) may be defined by Table 2.

TABLE 2

ASN1START
TimeToTrigger ::= ENUMERATED {ms0, ms40, ms64, ms80, ms100, ms128, ms160, ms256, ms320, ms480, ms512, ms640, ms1024, ms1280, ms2560, ms5120}
-- ASN1STOP The value ms0 corresponds to 0 ms. The value ms40 corresponds to 40 ms. The value ms5120 corresponds to 5120 ms.

Hereinafter, an unlicensed band is described.

Figure 6:
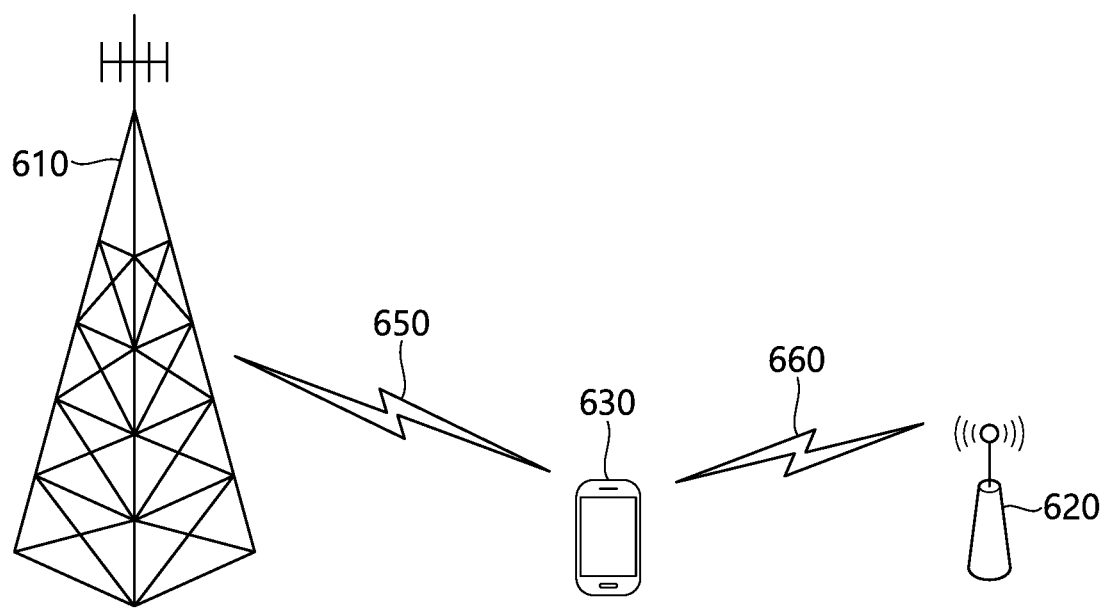
FIG. 6 shows an example of the LTE service using a license-exempt band.

FIG. 6 shows an example of the LTE service using a license-exempt band.

Wireless device 130 may establish a connection with the first base station 110, and receives a service through a licensed band (licensed band). For traffic offloading, the wireless device 130 may receive the service through the second base station 120 and unlicensed bands (unlicensed band).

The first base station 110, but base station supporting the LTE system, the second base station 120 may also support other communication protocols such as WLAN (wireless local area network), in addition to LTE. The first base station 110 and second base station 120 may be a particular cell is coupled to the (carrier aggregation) CA environment, the first base station 110, the first selil. Alternatively, the base station is coupled to the first 110 and the second base station 120 is connected to the double (dual connectivity) environment, a particular cell of the first base station 110 to the primary selil. The first base station 110, typically having a first chasel has a wider coverage than the second base station 120. The first base station 110 can be called a macro cell. The second base station 120 may be described as the small cell, a femtocell, or microcell. The first base station 110 can operate the first chasel and zero or more second chasel. The second base station 120 may operate the one or more second chasel. Chasel 2 can be activated/deactivated by the instruction of one chasel. Above is for exemplary purposes only, and the first base station 110 is equivalent to one chasel, the second base station 120 corresponds to the second chasel, it may be managed by one base station.

Licensed band is the band that guarantees exclusive use (exclusive use) to a specific communication protocol or a particular company. Unlicensed band is the band and to ensure coexistence of different communication protocols, using a shared (shared use). The unlicensed band may include 2.5 GHz and/or 5 GHz band WLAN is used.

By default, the license-exempt bands assumes a secure channel through competition between each communication node. Accordingly, the communication in the unlicensed band may require that by performing channel sensing to identify the different communication node does not transmit a signal. This is called a convenience LBT (listen before talk), defines that the other communication node is a case where it is determined that unless the signal transmission CCA (clear channel assessment) check.

Hereinafter, an L3 filter will be described.

The L3 filter is for a process of filtering a measurement result value on the basis of Equation 1 below.

$$F_n = (1-a) \cdot F_{n-1} + a \cdot M_n \quad \text{[Equation 1]}$$

Fn−1 is a previous filtering value. Mn is a newly measured result value. 'a' is an L3 filtering coefficient. The L3 filtering coefficient specifies a ratio of the newly measured result value and the previous filtering value. That is, the L3 filtering is a process of deriving a new filtering value by applying the L3 filtering coefficient to the previous filtering value and the newly measured result value. The new filtering value may be used to evaluate whether measurement reporting is triggered.

Figure 7:
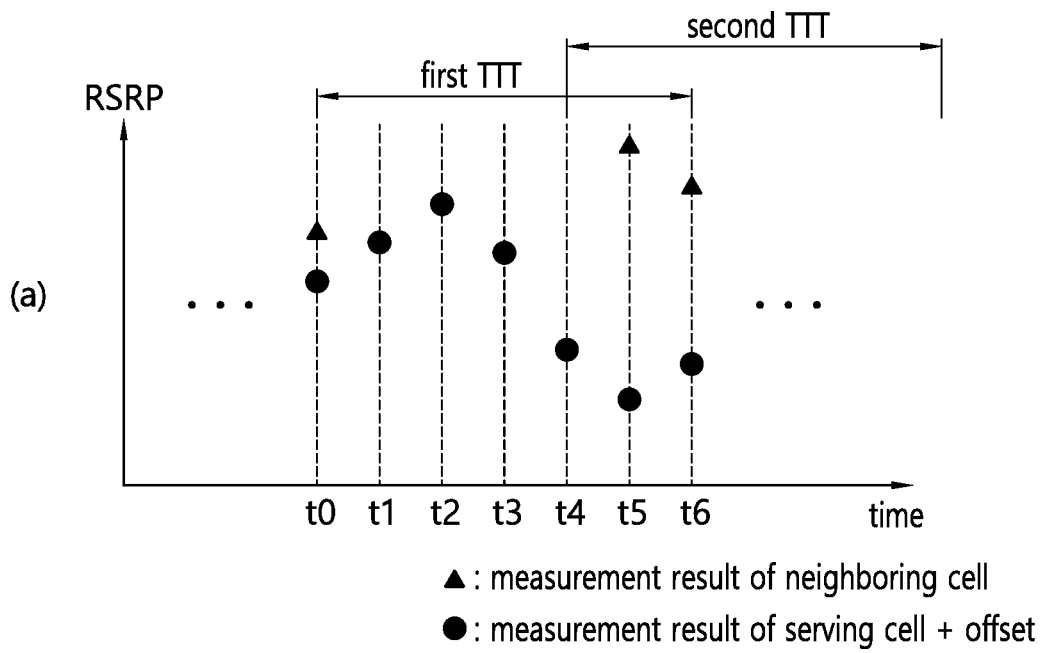
FIG. 7 shows a problem which may occur in a process of determining whether to report a measurement result by a user equipment (UE).
Figure 7:
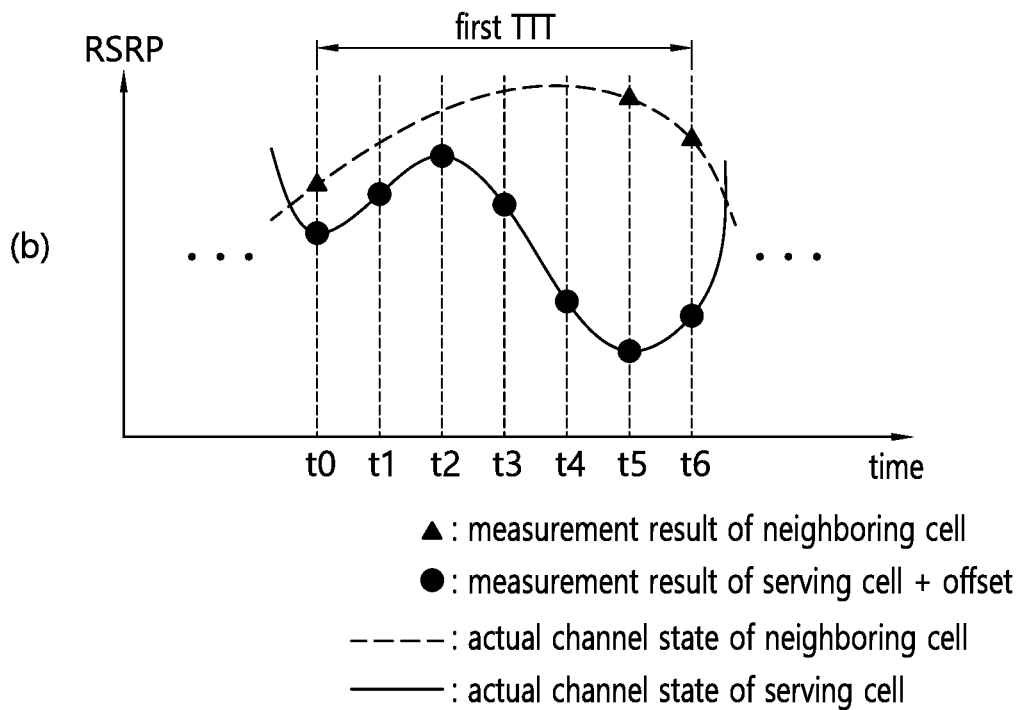

FIG. 7 shows a problem which may occur in a process of determining whether to report a measurement result by a UE. FIG. 7A shows a result of adding an offset to a measurement result of a serving cell measured by a UE and a measurement result of a neighboring cell. FIG. 7B shows an actual channel state of a serving cell and a neighboring cell.

The UE may periodically measure the serving cell and the neighboring cell. The measurement result of the serving cell may be RSRP of the serving cell. The measurement result of the neighboring cell may be RSRP of the neighboring cell.

Referring to FIG. 7A, since a measurement result value of a neighboring cell measured at a time t0 is greater than a value obtained by applying an offset to the measurement result value of the serving cell, a first TTT operation may start. However, the measurement result value of the serving cell is derived by the UE at times t1 to t4, whereas the measurement result value of the neighboring cell may not be derived by the UE at the times t1 to t4. Therefore, the L3 filter for the neighboring cell may be initialized. The neighboring cell may be a cell which exists on an unlicensed frequency. For example, in case of the unlicensed frequency, a CRS may be transmitted only when a channel is occupied. Therefore, the measurement result value of the neighboring cell may not be derived by the UE at the times t1 to t4. In this case, the first TTT operation may stop at any one of the times t1 to t4. Since the first TTT operation stops before the TTT timer expires, measurement reporting may not be performed. Thereafter, since the measurement result value of the neighboring cell measured at a time t5 is greater than a value obtained by applying the offset to the measurement result value of the serving cell, a second TTT operation may start.

However, the actual channel state of the serving cell and the neighboring cell may be as shown in FIG. 7B. Although the measurement result value of the neighboring cell is not derived by the UE at the times t1 to t4, the actual channel state of the neighboring cell may be better than the actual channel state of the serving cell from the time t0 to a time t6 at which the TTT timer expires after the first TTT operation starts. In this case, the measurement reporting may be preferably performed at the time t6. However, as shown in FIG. 7A, if the first TTT operation stops since the measurement result value of the neighboring cell is not derived by the UE at the times t1 to t4, the measurement reporting may not be performed at the time t6.

As described in the embodiment of FIG. 7, if the TTT is aborted whenever the L3 filter is reset, measurement reporting for an unlicensed frequency may not be performed even if a radio condition is not bad. Therefore, there is a need to propose a method of performing the measurement reporting on the basis of a TTT abort timer by a terminal, and an apparatus supporting the method.

Hereinafter, according to an embodiment of the present invention, a method of performing measurement reporting by a UE will be described in detail. In the present specification, stopping of a timer may be different from aborting of the timer. The stopping of the timer may imply that the timer stops running and is initialized. The aborting of the timer may imply that the stopping of the timer is deferred.

<TTT Abort Timer>

There is a need to propose a TTT abort timer to prevent a TTT from stopping whenever an L3 filter is reset. The TTT abort timer may be used to measure an unlicensed frequency. The TTT abort timer may be set by a network. The TTT abort timer may be set by a UE.

1. Starting of TTT Abort Timer

The TTT abort timer may start during the TTT timer is running. When the TTT abort timer starts, the stopping of the TTT timer may be deferred. Therefore, the TTT timer may run continuously.

(1) The TTT abort timer may start when a valid first layer (L1) measurement sample does not arrive at a third layer (L3) during a determined period. The determined period may be a time period ranging from a time at which an L3 reset timer starts to a time at which the L3 reset timer expires. For example, since the TTT abort timer starts even if the valid L1 measurement samples does not arrive at the L3 during the determined period, the TTT timer may not stop.

(2) Upon expiry of the L3 reset timer, the TTT abort timer may start. The L3 reset timer may be a time newly defined to determine whether the valid measurement sample is delivered to the L3 within a specific period.

(3) When the L3 filter is deactivated, the TTT abort timer may start. The L3 filter may be a filter for calculating a new filtering value on the basis of a previously measured filtering value, a newly measured measurement value, and an L3 filtering coefficient. For example, even if the L3 filter is deactivated, the TTT timer may not stop since the TTT abort timer starts.

(4) When the UE considers that the L3 measurement result is unavailable, the TTT abort timer may start. For example, even if the L3 measurement result is unavailable, the TTT timer may not stop since the TTT abort timer starts.

2. Stopping of TTT Abort Timer

When the started TTT abort timer stops, the TTT timer in which the stopping is deferred may restart. Therefore, the TTT timer may run continuously.

(1) The TTT abort timer may stop when a valid first layer (L1) measurement sample arrives at a third layer (L3). For example, when the valid L1 measurement sample does not arrive at the L3 during a determined period, the TTT abort timer may start. Further, the stopping of the TTT timer may be deferred. Thereafter, when the valid L1 measurement sample arrives at the L3, the TTT abort timer may stop. Further, the TTT timer in which the stopping is deferred may run continuously.

(2) When the L3 filter is activated, the TTT abort timer may stop. The L3 filter may be a filter for calculating a new filtering value on the basis of a previously measured filtering value, a newly measured measurement value, and an L3 filtering coefficient. For example, when the L3 filter is deactivated, the TTT abort timer may start. Further, the stopping of the TTT timer may be deferred. Thereafter, when the L3 filter is activated, the TTT abort timer may stop. Further, the TTT timer in which the stopping is deferred may run continuously.

(3) When the UE considers that the L3 measurement result is available, the TTT abort timer may stop. For example, when the UE considers that the L3 measurement result is unavailable, the TTT abort timer may start. Further, the stopping of the TTT timer may be deferred. Thereafter, when the UE considers that the L3 measurement result is available, the TTT abort timer may stop. Further, the TTT timer in which the stopping is deferred may run continuously.

(4) When the measurement reporting is triggered, the TTT abort timer may stop.

3. Expiry of TTT Abort Timer

Upon expiry of the started TTT abort timer, the TTT timber may stop. That is, when the TTT abort timer expires, the TTT timer in which the stopping is deferred may stop. When the TTT timer stops, the UE may consider that the measurement result does not satisfy the measurement report trigger condition anymore. In addition, the UE may stop the TTT timer.

Figure 8:
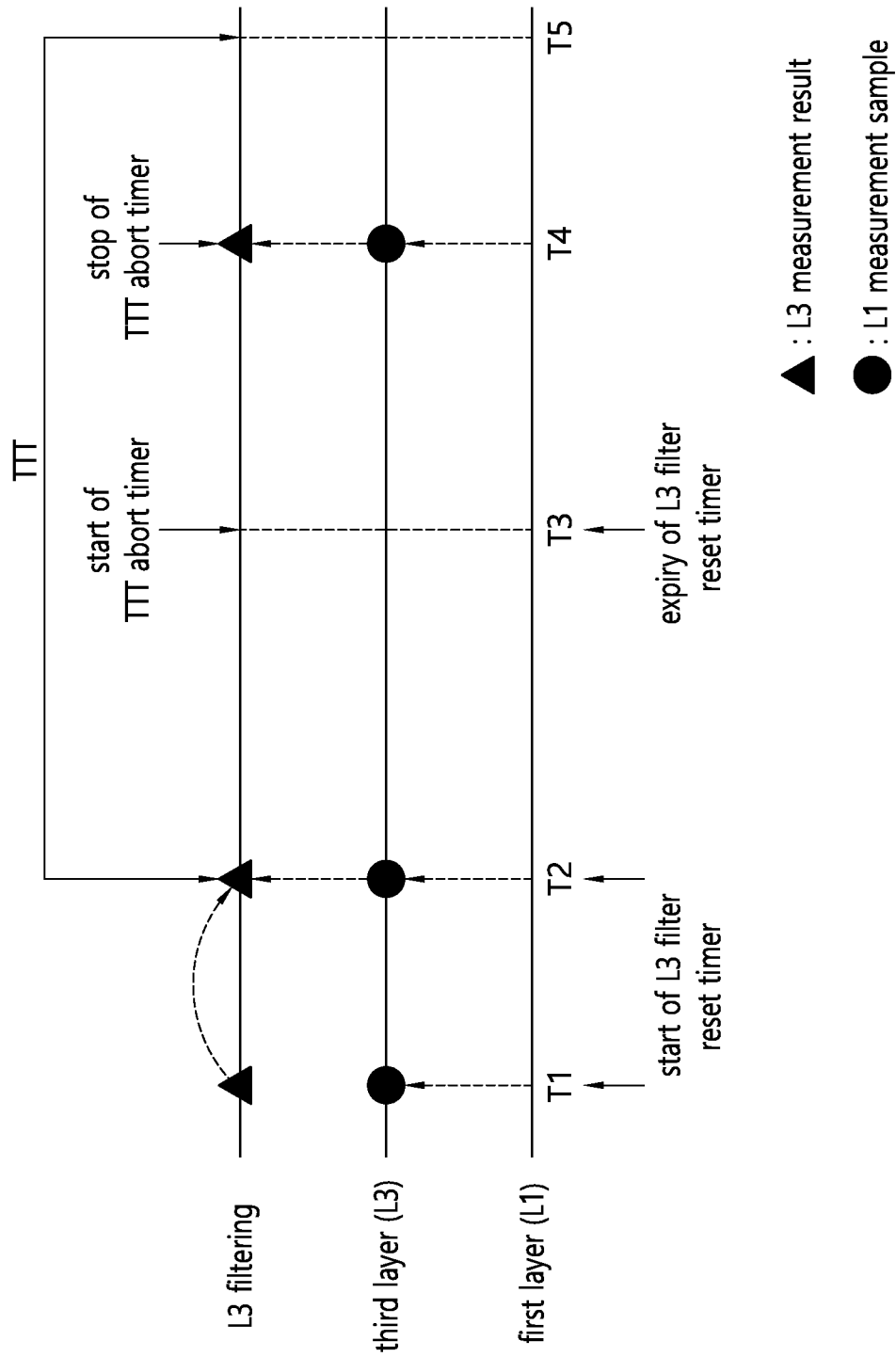
FIG. 8 shows an example of stopping a TTT abort timer according to an embodiment of the present invention.

FIG. 8 shows an example of stopping a TTT abort timer according to an embodiment of the present invention.

Referring to FIG. 8, an L1 measurement sample may be delivered to an L3. In addition, a UE may perform L3 filtering on the L1 measurement sample, and may determine whether a value subjected to the L3 filtering satisfies a measurement report trigger condition. The L1 measurement sample subjected to the L3 filtering may be an L3 measurement result.

It is assumed that a valid L1 measurement sample arrives at the L3 at a time T1. Therefore, the UE may start an L3 filter reset timer. The L3 reset timer may be a time newly defined to determine whether the valid measurement sample is delivered to the L3 within a specific period. Further, the UE may perform the L3 filtering on the L1 measurement sample. It is assumed that the L3 measurement result obtained by performing the L3 filtering does not satisfy the measurement report trigger condition. Therefore, a TTT operation may not start. That is, a TTT timer may not start.

It is assumed that a new valid L1 measurement sample arrives at the L3 at a time T2 before expiry of the L3 filter reset timer started at the time TL Therefore, the UE may initialize and restart the L3 filter reset timer. Further, the UE may perform the L3 filtering on the L1 measurement sample. It is assumed that the L3 measurement result obtained by performing the L3 filtering satisfies the measurement report trigger condition. Therefore, the TTT operation may start. That is, the TTT timer may start.

It is assumed that the valid L1 measurement sample does not arrive at the L3 during a specific period at a time T3. Alternatively, it is assumed that the valid L1 measurement sample does not arrive at the L3 until expiry of the L3 filter reset timer restarted at the time T2. In this case, the UE may reset the L3 filter. In addition, the UE may consider that the L3 measurement result is unavailable. In addition, the UE may start the TTT abort timer.

At a time T4, the L3 measurement result may be available before expiry of the TTT abort timer. The L3 filter may be activated before expiry of the TTT abort timer. Further, it is assumed that the L3 measurement result satisfies the measurement report trigger condition at the time T4. Therefore, the UE may stop the TTT abort timer.

At a time T5, the TTT timber may expire. Therefore, the UE may report the L3 measurement result satisfying the measurement report trigger condition to a network.

Figure 9:
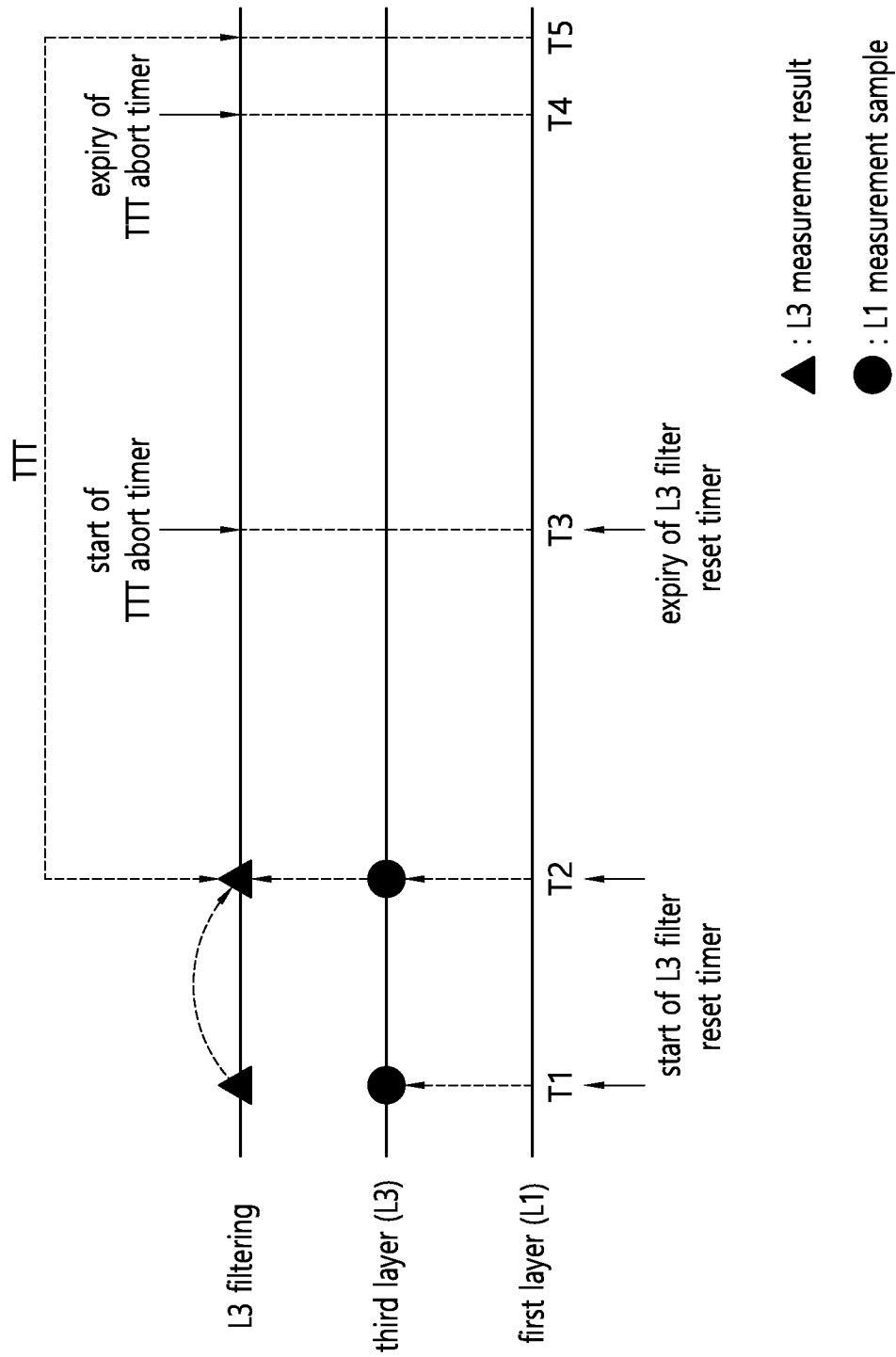
FIG. 9 shows an example of expiry of a TTT abort timer according to an embodiment of the present invention.

FIG. 9 shows an example of expiry of a TTT abort timer according to an embodiment of the present invention.

Referring to FIG. 9, an L1 measurement sample may be delivered to an L3. In addition, a UE may perform L3 filtering on the L1 measurement sample, and may determine whether a value subjected to the L3 filtering satisfies a measurement report trigger condition. The L1 measurement sample subjected to the L3 filtering may be an L3 measurement result.

It is assumed that a valid L1 measurement sample arrives at the L3 at a time T1. Therefore, the UE may start an L3 filter reset timer. The L3 reset timer may be a time newly defined to determine whether the valid measurement sample is delivered to the L3 within a specific period. Further, the UE may perform the L3 filtering on the L1 measurement sample. It is assumed that the L3 measurement result obtained by performing the L3 filtering does not satisfy the measurement report trigger condition. Therefore, a TTT operation may not start. That is, a TTT timer may not start.

It is assumed that a new valid L1 measurement sample arrives at the L3 at a time T2 before expiry of the L3 filter reset timer started at the time TL Therefore, the UE may initialize and restart the L3 filter reset timer. Further, the UE may perform the L3 filtering on the L1 measurement sample. It is assumed that the L3 measurement result obtained by performing the L3 filtering satisfies the measurement report trigger condition. Therefore, the TTT operation may start. That is, the TTT timer may start.

It is assumed that the valid L1 measurement sample does not arrive at the L3 during a specific period at a time T3. Alternatively, it is assumed that the valid L1 measurement sample does not arrive at the L3 until expiry of the L3 filter reset timer restarted at the time T2. In this case, the UE may reset the L3 filter. In addition, the UE may consider that the L3 measurement result is unavailable. In addition, the UE may start the TTT abort timer.

At a time T4, the TTT abort timer may expire before the TTT timer expires. Alternatively, the TTT abort timer may expire before a measurement report is triggered. The UE may stop the TTT timer.

At a time T5, a measurement report may not be triggered. Therefore, the UE may not report the measurement result to the network.

Figure 10:
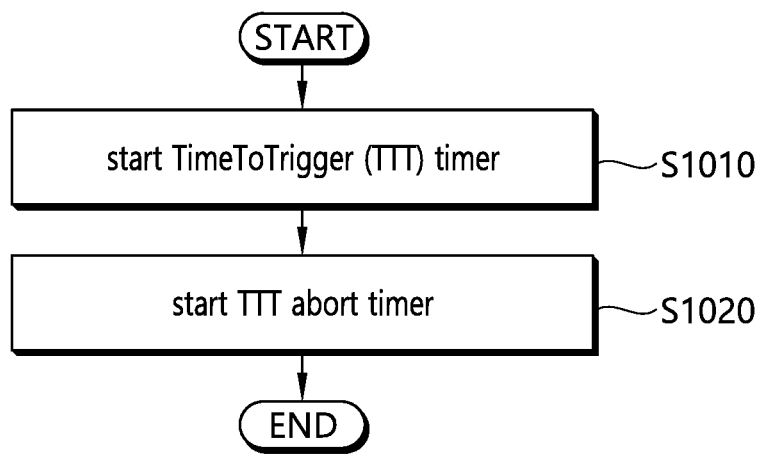
FIG. 10 is a block diagram showing a method of performing measurement reporting on the basis of a TTI abort timer by a UE according to an embodiment of the present invention.

FIG. 10 is a block diagram showing a method of performing measurement reporting on the basis of a TTI abort timer by a UE according to an embodiment of the present invention.

In step S1010, the UE may start a TimeToTrigger (TTT) timer.

In step S1020, the UE may start the TTT abort timer. The TTT abort timer may start during the TTT timer is running.

The TTT abort timer may start when a valid L1 measurement sample doesn't arrive at an L3 during a determined period. The determined period may be a time period ranging from a time at which an L3 filter reset timer starts to a time at which the L3 filter reset timer expires.

The TTT abort timer may start when it is considered that a L3 layer measurement result is unavailable. The L3 layer measurement result may be calculated by performing L3 filtering on a measurement sample delivered from the L1 to the L3.

When the L3 filter is deactivated, the TTT abort timer may start.

The UE may stop the started TTT abort timer.

The TTT abort timer may stop when a valid L1 measurement sample arrives at the L3 before expiry of the TTT abort timer.

The TTT abort timer may stop when it is considered that an L3 measurement result is available before expiry of the TTT abort timer. The UE may report the L3 measurement result to a network when the L3 measurement result satisfies a measurement report trigger condition.

The TTT abort timer may stop when the L3 filter is activated before expiry of the TTT abort timer.

The TTT abort timer may stop when measurement reporting is performed before expiry of the TTT abort timer.

The TTT timer may start when the L3 measurement result satisfies the measurement report trigger condition.

Upon expiry of the TTT abort timer, the started TTT timer may stop, and the measurement reporting may not be performed.

Figure 11:
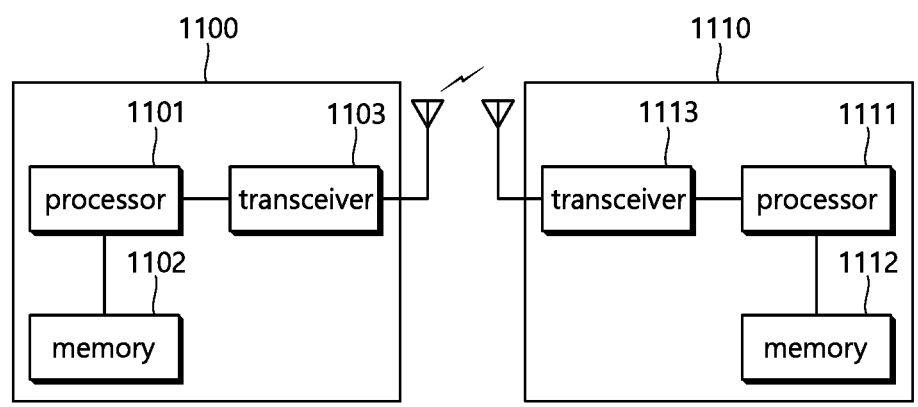
FIG. 11 is a block diagram illustrating a wireless communication system according to the embodiment of the present invention.

FIG. 11 is a block diagram illustrating a wireless communication system according to the embodiment of the present invention.

A BS 1100 includes a processor 1101, a memory 1102 and a transceiver 1103. The memory 1102 is connected to the processor 1101, and stores various pieces of information for driving the processor 1101. The transceiver 1103 is connected to the processor 1101, and transmits and/or receives radio signals. The processor 1101 implements proposed functions, processes and/or methods. In the above embodiment, an operation of the base station may be implemented by the processor 1101.

A UE 1110 includes a processor 1111, a memory 1112 and a transceiver 1113. The memory 1112 is connected to the processor 1111, and stores various pieces of information for driving the processor 1111. The transceiver 1113 is connected to the processor 1111, and transmits and/or receives radio signals. The processor 1111 implements proposed functions, processes and/or methods. In the above embodiment, an operation of the UE may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a wireless device in a wireless communication system, the method comprising:
    starting a reset timer to run based on upon obtaining a measurement sample;
    obtaining a measurement result from the measurement sample;
    determining that the measurement result satisfies a triggering condition for a measurement report, upon which a time-to-trigger (TTT) is started;
    starting a time-to-trigger (TTT) timer to run based on the determination that the measurement result obtained from the measurement sample satisfies the triggering condition for the measurement report;
    starting a TTT abort timer upon an expiry of the reset timer,
    wherein the TTT keeps running while the TTT abort timer is running, and the reset timer expires based on that the measurement sample is not obtained during a time period related to the reset timer; and
    transmitting, to a network, the measurement report upon an expiry of the TTT.

2. The method of claim 1, wherein the TTT abort timer starts when a valid layer 1 (L1) measurement sample is not delivered to a layer 3 (L3) during the time period.

3. The method of claim 2, wherein the time period ranges from a time at which the reset timer starts to a time at which the reset timer expires.

4. The method of claim 1, wherein the TTT abort timer starts when it is considered that a layer 3 (L3) measurement result is unavailable.

5. The method of claim 4, wherein the L3 measurement result is calculated by performing L3 filtering on a measurement sample delivered from a layer 1 (L1) to the L3.

6. The method of claim 1, wherein the TTT abort timer starts when a layer 3 (L3) filter is deactivated.

7. The method of claim 1, further comprising stopping the TTT abort timer.

8. The method of claim 7, wherein the TTT abort timer stops when a valid layer 1 (L1) measurement sample arrives at a layer 3 (L3) before an expiry of the TTT abort timer.

9. The method of claim 7, wherein the TTT abort timer stops when it is considered that a layer 3 (L3) measurement result is available before an expiry of the TTT abort timer.

10. The method of claim 9, wherein the transmitting of the measurement report comprises reporting, by the terminal, the L3 measurement result to the network when the L3 measurement result satisfies the triggering condition.

11. The method of claim 7, wherein the TTT abort timer stops when an L3 filter is activated before an expiry of the TTT abort timer.

12. The method of claim 7, wherein the TTT abort timer stops when the measurement report is transmitted before an expiry of the TTT abort timer.

13. The method of claim 1, wherein the TTT starts when a layer 3 (L3) measurement result satisfies the triggering condition.

14. The method of claim 1, wherein upon an expiry of the TTT abort timer, the TTT stops, and a measurement reporting is not performed.

15. A wireless device in a wireless communication system comprising:
    a memory;
    a transceiver; and
    at least one processor coupled to the memory and the transceiver, wherein the at least one processor is configured to:
        start a reset timer upon obtaining a measurement sample,
        obtain a measurement result from the measurement sample,
        determine that the measurement result satisfies a triggering condition for a measurement report, upon which a time-to-trigger (TTT) is started,
        start a TTT abort timer upon an expiry of the reset timer,
        wherein the TTT keeps running while the TTT abort timer is running, and the reset timer expires based on that a measurement sample is not obtained during a time period related to the reset timer, and
        control the transceiver to transmit, to a network, the measurement report upon an expiry of the TTT.

* * * * *